United States Patent
Inagaki et al.

(10) Patent No.: US 10,224,127 B2
(45) Date of Patent: Mar. 5, 2019

(54) POLYACETAL RESIN COMPOSITION AND MOLDED ARTICLE OF THE SAME

(71) Applicant: ASAHI KASEI CHEMICALS CORPORATION, Tokyo (JP)

(72) Inventors: Nozomi Inagaki, Tokyo (JP); Takaaki Miyoshi, Tokyo (JP); Junichi Tsuzuki, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 40 days.

(21) Appl. No.: 14/646,875

(22) PCT Filed: Nov. 25, 2013

(86) PCT No.: PCT/JP2013/081621
§ 371 (c)(1),
(2) Date: May 22, 2015

(87) PCT Pub. No.: WO2014/084160
PCT Pub. Date: Jun. 5, 2014

(65) Prior Publication Data
US 2015/0294750 A1    Oct. 15, 2015

(30) Foreign Application Priority Data

Nov. 27, 2012 (JP) .................................. 2012-258277

(51) Int. Cl.
*H01B 1/24* (2006.01)
*C08L 59/02* (2006.01)
(Continued)

(52) U.S. Cl.
CPC ................ *H01B 1/24* (2013.01); *C08K 3/04* (2013.01); *C08K 3/08* (2013.01); *C08L 23/06* (2013.01);
(Continued)

(58) Field of Classification Search
CPC .... H01B 1/24; H01B 1/20; H01B 1/04; C08L 59/00; C08L 59/02; C08L 59/04;
(Continued)

(56) References Cited

U.S. PATENT DOCUMENTS

| 4,831,073 A | 5/1989 | Okushiro et al. |
| 5,207,949 A | 5/1993 | Niino et al. |

(Continued)

FOREIGN PATENT DOCUMENTS

| JP | S62-267351 A | 11/1987 |
| JP | S63-210161 A | 8/1988 |

(Continued)

OTHER PUBLICATIONS

Alkaline metal. WordNet 3.0, Farlex clipart collection. (2003-2008, retrieved Nov. 15, 2016 from http://www.thefreedictionary.com/alkaline+metal).*

(Continued)

*Primary Examiner* — Harold U Pyon
*Assistant Examiner* — Matthew R Diaz
(74) *Attorney, Agent, or Firm* — Greenblum & Bernstein, P.L.C.

(57) ABSTRACT

The resin composition according to the present invention contains a polyacetal resin having a specific molecular weight distribution, a specific carbon black, and an alkaline metal wherein the contents of the carbon black and the alkaline metal are in specific ranges. The molded article according to the present invention contains the resin composition.

10 Claims, 1 Drawing Sheet

(51) Int. Cl.
*C08L 59/04* (2006.01)
*C08K 3/04* (2006.01)
*C08L 63/00* (2006.01)
*C08K 3/08* (2006.01)
*C08L 23/06* (2006.01)

(52) U.S. Cl.
CPC ............... *C08L 59/02* (2013.01); *C08L 59/04* (2013.01); *C08L 63/00* (2013.01); *C08K 2201/001* (2013.01); *C08K 2201/006* (2013.01); *C08L 2205/03* (2013.01); *C08L 2207/062* (2013.01)

(58) Field of Classification Search
CPC ........... C08L 2205/03; C08L 2205/035; C08L 2203/20; C08L 2203/202; C08L 2203/204; C08L 2203/206; C08K 3/04; C08K 2201/001; C08K 2201/002; C08K 2201/006; C08K 2003/0818; C08K 2003/0825; C08K 2201/014; C09D 159/00; C09D 159/02; C09D 159/04; C09D 1/48; C09D 1/50; C09D 1/52; C09D 1/54; C09D 1/56

See application file for complete search history.

(56) References Cited

U.S. PATENT DOCUMENTS

| | | | | |
|---|---|---|---|---|
| 5,866,670 A * | 2/1999 | Nakai | ...................... | C08G 2/06 528/230 |
| 5,902,517 A | 5/1999 | Thielen | | |
| 6,388,049 B1 * | 5/2002 | Yokoyama | ............... | C08G 2/10 525/398 |
| 6,645,629 B2 * | 11/2003 | Hisashi | ..................... | C09D 5/24 252/512 |
| 6,793,997 B2 * | 9/2004 | Schmitz | .............. | B29C 45/1642 138/137 |
| 7,186,766 B2 * | 3/2007 | Harashina | ................. | C08K 5/13 524/100 |
| 7,906,609 B2 * | 3/2011 | Blinzler | .................. | C08L 59/04 528/230 |
| 2006/0063863 A1 * | 3/2006 | Sunaga | ..................... | C08K 5/13 524/100 |
| 2007/0235693 A1 | 10/2007 | Price et al. | | |
| 2013/0323451 A1 * | 12/2013 | Junger | .................... | C08G 18/56 428/36.9 |
| 2015/0034882 A1 | 2/2015 | Inagaki et al. | | |

FOREIGN PATENT DOCUMENTS

| | | |
|---|---|---|
| JP | H03-296557 A | 12/1991 |
| JP | 2001-503559 A | 3/2001 |
| JP | 2009-532522 A | 9/2009 |
| JP | 2009-269996 A | 11/2009 |
| JP | 2012-236905 A | 12/2012 |
| WO | 2013-108834 A1 | 7/2013 |

OTHER PUBLICATIONS

International Search report issued with respect to application No. PCT/JP2013/081621, dated Mar. 4, 2014.
International preliminary report on patentability issued with respect to application No. PCT/JP2013/081621, dated Jun. 2, 2015.

* cited by examiner

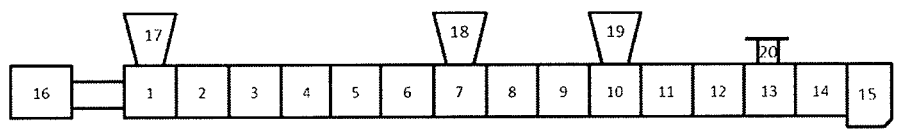

POLYACETAL RESIN COMPOSITION AND MOLDED ARTICLE OF THE SAME

TECHNICAL FIELD

The present invention relates to a polyacetal resin composition and a molded article.

BACKGROUND ART

Polyacetal resins, since being excellent in the balance among the mechanical strength, the chemical resistance and the slidability, and being easy in their processing, are used as typical engineering plastics over a wide range centered on mechanism parts of electric devices, automobile parts and other precision machines. Polyacetal resins are resins which are often used under the frictional environment by making the best use of their high slidability.

Usually since polyacetal resins are electrically insulative, static electricity generated by friction is accumulated and charged without being removed, and adsorbs surrounding dusts, which infiltrate into the frictional surface to thereby cause trouble of bringing about an increase in the abrasion amount and the generation of backlash of parts. In order to prevent these, there is conventionally disclosed a technology of imparting the electroconductivity by blending a polyacetal resin with carbon black and other electroconductive fillers (for example, see Patent Document 1). There are also known technologies of obtaining electroconductive polyacetal resin compositions having various additional properties by blending electroconductive materials having various different properties (for example, see Patent Documents 2, 3 and 4).

LIST OF PRIOR ART DOCUMENTS

Patent Document

Patent Document 1: Japanese Patent Laid-Open No. 63-210161
Patent Document 2: Japanese Patent Laid-Open No. 3-296557
Patent Document 3: National Publication of International Patent Application No. 2001-503559
Patent Document 4: Japanese Patent Laid-Open No. 2009-269996

SUMMARY OF INVENTION

Problems to be Solved by Invention

As a recent year's market trend, there is a movement of applying electroconductive polyacetal resin compositions to comparatively large-diameter gears and the like, and the demand on electroconductive polyacetal resin compositions exhibiting a higher dimensional precision (low shrinkage and dimensional precision) is raised.

The demand on the handleability for polyacetal resin compositions is also raised. When polyacetal resin compositions are exposed to heat for a long time, the polyacetal resin compositions decompose and generate formaldehyde gas. Molded articles composed of polyacetal resin compositions thereby develop silver streaks on their surface and bring about poor appearance. The generation of the silver streaks is remarkable particularly in the case where after a molding machine is suspended for a long time (noon recess and the like), its operation is resumed. In order to avoid this, after a long-time suspension, waste shots need to be carried out until good-appearance products become available. In the recent market, there is raised the demand on polyacetal resin compositions having so high a thermal stability that products can be obtained without waste shots when molding is resumed after an injection molding machine is suspended during noon recess.

Demands are raised further in the viewpoints conventionally not seen. That is, there have been demanded polyacetal resin compositions having a high electroconductivity and being capable of stably providing a high electroconductivity. Specifically, there is demanded a polyacetal resin composition whose molded articles have a high electroconductivity and a small variation width in the electroconductivity among the molded articles.

However, although the polyacetal resin compositions described in Patent Documents 1, 2, 3 and 4 have a high electroconductivity, from the viewpoint of the dispersion in the electroconductivity among molded articles, the polyacetal resin compositions cannot be affirmed to sufficiently meet current high-level demands, and the development of a novel polyacetal resin composition is demanded.

The present invention, in consideration of the above conventional technologies, has an object to provide a resin composition containing a polyacetal resin and an electroconductive filler, the resin composition being excellent in the dimensional precision, having a high thermal stability, having a high electroconductivity, and being capable of suppressing the variation width in the electroconduction to a minimum; and to provide a molded article containing the resin composition.

Means for Solving Problems

As a result of exhaustive studies to solve the above-mentioned problem, the present inventors have found that a resin composition can solve the above problem, the resin composition containing a polyacetal resin having a specific molecular weight distribution, a specific carbon black and an alkaline metal as constituting components, and the contents of the carbon black and the alkaline metal being in specific quantitative ranges; and this finding has led to the completion of the present invention.

That is, the present invention is as follows.

[1]
A resin composition, comprising a polyacetal resin, a carbon black and an alkaline metal, the resin composition meeting the following requirements (i) to (v):
(i) the polyacetal resin in the resin composition has at least one peak in each of a range of a molecular weight thereof of less than 10,000 and a range of a molecular weight thereof of 10,000 or more in a chart of a gel permeation chromatography (GPC) measurement;
(ii) the carbon black in the resin composition has a BET specific surface area (nitrogen adsorption method) of 20 to 150 $m^2/g$;
(iii) the carbon black in the resin composition has a dibutyl phthalate oil absorption of 100 to 300 mL/100 g;
(iv) a content of the carbon black in the resin composition is at least 10% by mass; and
(v) a content of the alkaline metal in the resin composition is 1 to 150 ppm by mass.
[2]
The resin composition according to [1], wherein the polyacetal resin in the resin composition has an amount of components having a molecular weight of less than 10,000 of 3 to 15% by mass.

[3]
The resin composition according to [1], wherein when the resin composition is heated at 230° C. in a nitrogen gas flow, the resin composition exhibits a generation rate of formaldehyde generated during a heating time of from 10 min to 30 min of 100 ppm by mass/min or less.
[4]
The resin composition according to [1], wherein the resin composition has a volume specific resistance at room temperature of 100 Ω·cm or less.
[5]
The resin composition according to [1], further comprising an epoxy compound.
[6]
The resin composition according to [5], further comprising an epoxy resin curing additive.
[7]
The resin composition according to [1], further comprising an olefinic resin.
[8]
A molded article, comprising the resin composition according to any of [1] to [7].
[9]
An injection-molded gear, comprising the resin composition according to any of [1] to [7].
[10]
A flange of a photoreceptor drum in an image-forming apparatus, comprising the resin composition according to any of [1] to [7].

Advantages of Invention

The present invention can provide: a resin composition suiting applications to parts requiring the precision, being excellent in the dimensional precision, having a high thermal stability and electroconductivity, and having a small variation width in the electroconductivity; and a molded article containing the resin composition.

BRIEF DESCRIPTION OF DRAWINGS

FIG. 1 is a schematic view of a twin-screw extruder used in the present Examples.

MODE FOR CARRYING OUT INVENTION

Hereinafter, an embodiment (hereinafter, called "the present embodiment") to carry out the present invention will be described in detail, but the present invention is not limited thereto. Various changes and modifications may be made without departing from its gist.

<Polyacetal Resin Composition>

A resin composition according to the present embodiment is a resin composition (hereinafter, also described as "polyacetal resin composition") comprising: a polyacetal resin, a carbon black and an alkaline metal, and meeting the following requirements (i) to (v):
(i) the polyacetal resin in the resin composition has at least one peak in each of a range of a molecular weight thereof of less than 10,000 and a range of a molecular weight thereof of 10,000 or more in a chart of a gel permeation chromatography (GPC) measurement;
(ii) the carbon black in the resin composition has a BET specific surface area (nitrogen adsorption method) of 20 to 150 m$^2$/g;
(iii) the carbon black in the resin composition has a dibutyl phthalate oil absorption of 100 to 300 mL/100 g;
(iv) a content of the carbon black in the resin composition is at least 10% by mass; and
(v) a content of the alkaline metal in the resin composition is 1 to 150 ppm by mass.

[Polyacetal Resin]

The polyacetal resin in the resin composition according to the present embodiment has at least one peak in each of a range of a molecular weight thereof of less than 10,000 and a range of a molecular weight thereof of 10,000 or more in a chart of a gel permeation chromatography (GPC) measurement. The resin composition containing the polyacetal resin having such a molecular weight distribution does not decrease the moldability and the flowability even in the case of containing a large amount of a specific carbon black described later, and can suppress mold deposits and suppress the generation of silver streaks after a long-time suspension.

In the polyacetal resin in the resin composition according to the present embodiment, a preferable lower limit of the components having a molecular weight of less than 10,000 is 3% by mass (here, the total amount of the polyacetal resin constituting the resin composition is taken to be 100% by mass); and a more preferable lower limit amount of the components having a molecular weight of less than 10,000 is 5% by mass; and a still more preferable lower limit amount of the components having a molecular weight of less than 10,000 is 8% by mass. Further in the polyacetal resin in the resin composition according to the present embodiment, a preferable upper limit amount of the components having a molecular weight of less than 10,000 is 15% by mass (here, the total amount of the polyacetal resin constituting the resin composition is taken to be 100% by mass); and a more preferable upper limit amount of the components having a molecular weight of less than 10,000 is 13% by mass; and a still more preferable upper limit amount of the components having a molecular weight of less than 10,000 is 12% by mass.

In the resin composition according to the present embodiment, it is likely that when the amount of the components having a molecular weight of less than 10,000 in the polyacetal resin is the above lower limit amount or more, the decrease of the mechanical strength can be suppressed, and further, the generation of formaldehyde and the generation of mold deposits can be suppressed; and when the amount of the components having a molecular weight of less than 10,000 in the polyacetal resin is the above upper limit amount or less, the decrease of the moldability and the flowability can be suppressed, and further, the generation of formaldehyde and the generation of mold deposits can be suppressed.

An example of a method for checking that the polyacetal resin in the resin composition has at least one peak in each of a range of a molecular weight thereof of less than 10,000 and a range of a molecular weight thereof of 10,000 or more in a chart of a gel permeation chromatography (GPC) measurement includes the following method. First, a small amount of the resin composition is sampled, and polyacetal components are dissolved in hexafluoroisopropanol to thereby obtain a solution. The obtained solution is filtered out, and thereafter, the molecular weight distribution is measured by subjecting the filtrate to a gel permeation chromatography (GPC) (carrier solvent: hexafluoroisopropanol). It can easily be checked in a chart acquired in the measurement whether or not each of the range of a molecular weight of less than 10,000 and the range of a molecular weight of 10,000 or more has at least one peak. A preferable polymer concentration in the solution at this time is about 0.1% by mass. Further in the present embodiment, the amount of the components having a molecular weight of less than 10,000 in the polyacetal resin can be known by using molecular weights in terms of polymethyl methacrylate (PMMA) using a calibration curve acquired by using PMMA as standard substances, and fractionally and quantitatively determining amounts of components having molecular weights in terms of PMMA of less than 10,000. These calculations can be easily analyzed using GPC software.

Here, in the present embodiment, a "peak" means a maximum value in a specific range, and excludes so-called shoulders and noises.

The polyacetal resin having a specific molecular weight distribution as described above can be obtained, for example, by a production method described later.

In the resin composition according to the present embodiment, the content of the polyacetal resin is preferably 40 to 90% by mass, more preferably 50 to 85% by mass, and still more preferably 60 to 80% by mass. When the content of the polyacetal resin is in the above range, the resin composition is likely to be good in the slidability.

In the resin composition according to the present embodiment, the weight-average molecular weight of the polyacetal resin is preferably 30,000 to 250,000, more preferably 35,000 to 200,000, and still more preferably 40,000 to 180,000. When the weight-average molecular weight of the polyacetal resin is in the above range, the resin composition is likely to be good in the mechanical strength and the moldability and the flowability.

In the resin composition according to the present embodiment, the melt flow rate (MFR) of the polyacetal resin is preferably 1.0 to 75 g/10 min, more preferably 2.0 to 60 g/10 min, still more preferably 8.0 to 55 g/10 min, and especially preferably 9.0 to 40 g/10 min. When the MFR of the polyacetal resin is in the above range, the resin composition is likely to be good in the electroconductivity and the appearance of molded pieces.

Here, in the present embodiment, the MFR of the polyacetal resin can be measured according to JIS K 7210 under the condition of a test temperature of 190° C. and a test load of 2.16 kg. Further the weight-average molecular weight of the polyacetal resin can be measured by a gel permeation chromatography (carrier solvent: hexafluoroisopropanol, standard substance: polymethyl methacrylate).

[Method for Producing the Polyacetal Resin]

The polyacetal resin to be used in the present embodiment can be obtained by a method, though not especially limited to, described in, for example, U.S. Pat. No. 3,027,352, U.S. Pat. No. 3,803,094, DE-C-1161421, DE-C-1495228, DE-C-1720358, DE-C-3018898 and Japanese Patent Laid-Open No. 7-70267. The method specifically includes a method in which boron trifluoride is used as a polymerization catalyst; the amount of the catalyst is adjusted so as to attain a yield of 80% or less; and the retention time in a polymerization machine is adjusted to become short (preferably 30 min or less).

The polyacetal resin to be used in the present embodiment is not especially limited as long as meeting the above-mentioned properties, but specific typical examples thereof include a polyacetal homopolymer composed substantially only of an oxymethylene unit obtained by homopolymerizing a formaldehyde monomer or a cyclic oligomer of formaldehyde such as a trimer thereof (trioxane) or a tetramer thereof (tetraoxane); and a polyacetal copolymer obtained by copolymerizing a formaldehyde monomer or a cyclic oligomer of formaldehyde with a cyclic ether and/or a cyclic formal such as a cyclic formal of a glycol or a diglycol of ethylene oxide, propylene oxide, epichlorohydrin, 1,3-dioxolane, 1,4-butanediol formal and the like. Additionally, there can also be used a polyacetal copolymer having branches obtained by copolymerizing a formaldehyde monomer or a cyclic oligomer of formaldehyde with a monofunctional glycidyl ether; a polyacetal copolymer having a crosslinking structure obtained by copolymerizing a formaldehyde monomer or a cyclic oligomer of formaldehyde with a polyfunctional glycidyl ether; a polyacetal homopolymer having block components obtained by polymerizing a formaldehyde monomer or a cyclic oligomer of formaldehyde in the presence of a compound having a functional group(s) such as a hydroxyl group(s) on both terminals or one terminal thereof, for example, a polyalkylene glycol; and a polyacetal copolymer having block components obtained by copolymerizing a formaldehyde monomer or a cyclic oligomer of formaldehyde with a cyclic ether and/or a cyclic formal in the presence of a compound having a functional group(s) such as a hydroxyl group(s) on both terminals or one terminal thereof, for example, a hydrogenated polybutadiene glycol. As described above, in the present embodiment, as the polyacetal resin, either of a polyacetal homopolymer and a polyacetal copolymer can be used, but a polyacetal copolymer is preferable.

A comonomer such as 1,3-dioxaolane is usually used, with respect to 1 mol of trioxane, though not especially limited to, in the range of preferably 0.1 to 60 mol %, more preferably 0.1 to 20 mol %, and still more preferably 0.13 to 10 mol %.

The melting point of the polyacetal resin to be used in the present embodiment is, though not especially limited to, preferably 162° C. to 173° C., more preferably 167° C. to 173° C., and still more preferably 167° C. to 171° C. The melting point of the polyacetal resin can be determined, for example, by the DSC measurement. A polyacetal copolymer having a melting point of 167° C. to 171° C. can be obtained by using a comonomer of about 1.3 to 3.5 mol % with respect to trioxane.

A polymerization catalyst in the polymerization of a polyacetal homopolymer and a polyacetal copolymer is, though not especially limited, preferably specifically a cationic active catalyst such as a Lewis acid, a protonic acid, an ester of a Lewis acid or a protonic acid, or an anhydride of a Lewis acid or a protonic acid. Examples of the Lewis acid include halides of boric acid, tin, titanium, phosphorus, arsenic and antimony, and specific examples thereof include boron trifluoride, tin tetrachloride, titanium tetrachloride, phosphorus pentafluoride, phosphorus pentachloride, antimony pentafluoride, complex compounds thereof, or salts thereof. Specific examples of protonic acids, esters thereof, or anhydrides of Lewis acids or protonic acids are not especially limited, but include perchloric acid, trifluoromethanesulfonic acid, perchloric acid-tertiary butyl ester, acetyl perchlorate and trimethyloxonium hexafluorophosphate. Above all, preferable are boron trifluoride; boron trifluoride hydrate; and coordinated complex compounds of an organic compound containing an oxygen atom or a sulfur atom with boron trifluoride, and suitable specific examples thereof include boron trifluoride diethyl ether and boron trifluoride di-n-butyl ether.

(Treatment Step of Unstable Terminals)

The polyacetal resin to be used in the present embodiment is preferably one whose unstable terminal groups generated in its polymerization have been treated. A polyacetal resin obtained in a polymerization, usually since having thermally unstable terminal moieties [—(OCH$_2$)$_n$—OH group], is preferably subjected to a decomposing removal treatment of the unstable terminal moieties. A method of the decomposing removal treatment is not especially limited, but a specific example thereof includes a method in which a polyacetal resin is subjected to a heat treatment in the state that the polyacetal resin is melted at a temperature of the melting point of the polyacetal resin or more and 260° C. or less in the presence of at least one quaternary ammonium compound represented by the following formula (1).

$$[R^1R^2R^3R^4N^+]_nX^{-n} \qquad \text{Formula (1)}$$

wherein $R^1$, $R^2$, $R^3$ and $R^4$ each independently represent an unsubstituted alkyl group or substituted alkyl group having 1 to 30 carbon atoms, an aryl group having 6 to 20 carbon atoms, an aralkyl group in which at least one hydrogen atom of an unsubstituted alkyl group or substituted alkyl group having 1 to 30 carbon atoms is substituted with an aryl group having 6 to 20 carbon atoms, or an alkylaryl group in which at least one hydrogen atom of an aryl group having 6 to 20 carbon atoms is substituted with an unsubstituted alkyl group or substituted alkyl group having 1 to 30 carbon atoms; and the unsubstituted alkyl group or substituted alkyl group is linear, branched or cyclic; the substituent of the substituted alkyl group is a halogen, a hydroxyl group, an aldehyde group, a carboxyl group, an amino group, or an amido group; a hydrogen atom(s) of the unsubstituted alkyl group, aryl group, aralkyl group and alkylaryl group may be substituted with a halogen atom(s); n represents an integer of 1 to 3; and X represents a hydroxyl group, or an acid residue of a carboxylic acid having 1 to 20 carbon atoms, a hydroacid other than hydrogen halides, an oxo-acid, an inorganic thio acid or an organic thio acid having 1 to 20 carbon atoms.

The quaternary ammonium compound to be used in the present embodiment is not especially limited as long as being a compound represented by the above formula (1), but preferable is the compound in which $R^1$, $R^2$, $R^3$ and $R^4$ in the formula (1) are each independently an alkyl group having 1 to 5 carbon atoms or a hydroxyalkyl group having 2 to 4 carbon atoms, and among these, more preferable is the compound in which at least one of $R^1$, $R^2$, $R^3$ and $R^4$ is a hydroxyethyl group. Such a quaternary ammonium compound is not especially limited, but specific examples thereof include hydroxides of tetramethylammonium, tetraethylammonium, tetrapropylammonium, tetra-n-butylammonium, cetyltrimethylammonium, tetradecyltrimethylammonium, 1,6-hexamethylenebis(trimethylammonium), decamethylene-bis-(trimethylammonium), trimethyl-3-chloro-2-hydroxypropylammonium, trimethyl(2-hydroxyethyl)ammonium, triethyl(2-hydroxyethyl)ammonium, tripropyl(2-hydroxyethyl) ammonium, tri-n-butyl(2-hydroxyethyl) ammonium, trimethylbenzylammonium, triethylbenzylammonium, tripropylbenzylammonium, tri-n-butylbenzylammonium, trimethylphenylammonium, triethylphenylammonium, trimethyl-2-oxyethylammonium, monomethyltrihydroxyethylammonium, monoethyltrihydroxyethylammonium, octadecyltri(2-hydroxyethyl)ammonium and tetrakis(hydroxyethyl)ammonium; salts of hydroacids such as hydrochloric acid, bromic acid, and hydrofluoric acid; salts of oxo acids such as sulfuric acid, nitric acid, phosphoric acid, carbonic acid, boric acid, chloric acid, iodic acid, silicic acid, perchloric acid, chlorous acid, hypochlorous acid, chlorosulfuric acid, amidosulfuric acid, disulfuric acid and tripolyphosphoric acid; salts of thio acids such as thiosulfuric acid; and carboxylate salts such as formic acid, acetic acid, propionic acid, butanoic acid, isobutyric acid, pentanoic acid, caproic acid, caprylic acid, capric acid, benzoic acid and oxalic acid. Among these, preferable are hydroxides ($OH^-$), and salts of sulfuric acid ($HSO_4^-$, $SO_4^{2-}$), carbonic acid ($HCO_3^-$, $CO_3^{2-}$), boric acid ($B(OH)_4^-$) and carboxylic acids. Among carboxylic acids, formic acid, acetic acid and propionic acid are more preferable. These quaternary ammonium compounds may be used singly or in combinations of two or more. Further in addition to the above quaternary ammonium compound, there can be concurrently used amines such as ammonia and triethylamine, which are well-known decomposition accelerators of unstable terminal moieties.

The amount of a quaternary ammonium compound used is, in terms of an amount of nitrogen originated from the quaternary ammonium compound represented by the following formula (2) with respect to the total mass of a polyacetal resin and the quaternary ammonium compound, preferably 0.05 to 50 ppm by mass, and more preferably 1 to 30 ppm by mass.

$$[\text{Amount of a quaternary ammonium compound used}]=P\times14/Q \qquad \text{Formula (2)}$$

wherein P represents a concentration (ppm by mass) of the quaternary ammonium compound with respect to the polyacetal resin; 14 is an atomic weight of nitrogen; and Q represents a molecular weight of the quaternary ammonium compound.

By making the amount of a quaternary ammonium compound used to be 0.05 ppm by mass or more, the decomposing removal rate of unstable terminal moieties is likely to be improved; and by making that to be 50 ppm by mass or less, there can be attained also an effect in which the color of the polyacetal resin after the decomposing removal of the unstable terminal moieties becomes good.

The decomposing removal treatment of unstable terminal moieties of the polyacetal resin to be used in the present embodiment can be carried out, for example, by subjecting the polyacetal resin to a heat treatment in the state that the polyacetal resin is melted at a temperature of the melting point of the polyacetal resin or more and 260° C. or less. An apparatus to be used in the heat treatment is not especially limited, but for example, an extruder or a kneader is suitable. Then, formaldehyde generated by the decomposing removal treatment of the unstable terminal moieties can be removed under reduced pressure from the system. An addition method of a quaternary ammonium compound is not especially limited, but examples thereof include a method of adding the compound as an aqueous solution, in a step of inactivating the polymerization catalyst, and a method of spraying the compound on a polyacetal resin produced in the polymerization. Use of the either addition method suffices if the quaternary ammonium compound is added in a step of subjecting the polyacetal resin to a heat treatment; the compound may be injected in an extruder, or if a product kind using the polyacetal resin is one obtained by blending a filler and a pigment by using an extruder or the like, the compound may be impregnated in resin pellets, and then, the treatment step of the unstable terminals may be carried out in a blend step thereafter.

The treatment step of unstable terminals can be carried out after a polymerization catalyst in a polyacetal resin obtained in the polymerization is inactivated, or can be carried out without the polymerization catalyst being inactivated. The inactivation operation of a polymerization catalyst is not especially limited, but an example thereof includes a method of neutralizing and inactivating the polymerization catalyst in a basic aqueous solution of amines or the like. It is also an effective method that the polymerization catalyst is heated at a temperature of its melting point or less in an inert gas atmosphere without the polymerization catalyst being inactivated to thereby vaporize and reduce the polymerization catalyst, and thereafter, the treatment step of the unstable terminals is carried out.

Polyacetal resins thus obtained have various types of terminal groups, and the amounts of these terminal groups can be determined by a $^1$H-NMR measurement, for example, as described in Japanese Patent Laid-Open No. 2001-11143.

The proportion of the amount of terminals having a formyl group (—CHO) with respect to the total terminal amount in the polyacetal resin is preferably 1.0% or less, more preferably 0.5% or less, more preferably 0.3% or less, and still more preferably 0.2% or less. When the amount of terminals having a formyl group is 1.0% or less, molded articles having a higher dimensional precision can be obtained, and a polyacetal resin composition better in the durability can be obtained.

In order to measure the amount of terminals having a formyl group with respect to the total terminal amount in the polyacetal resin, polyacetal components need to be extracted from the resin composition. A specific method of determining the amount thereof involves, for example, sampling a small amount of the resin composition, dissolving polyacetal components in heavy hexafluoroisopropanol, filtering out the solution, and thereafter carrying out a $^1$H-NMR measurement for the obtained filtrate. A preferable polymer concentration in the solution at this time is about 0.1% by mass.

[Carbon Black]

A carbon black in the resin composition according to the present embodiment has a BET specific surface area by the nitrogen adsorption method of 20 to 150 $m^2/g$, and a dibutyl phthalate oil absorption of 100 to 300 mL/100 g.

A measurement method of the BET specific surface area by the nitrogen adsorption method of a carbon black and a measurement method of the dibutyl phthalate oil absorption of the carbon black can use well-known methods. For example, the BET specific surface area by the nitrogen adsorption method can be determined by the BET expression from a nitrogen adsorption based on JIS K6217; and the dibutyl phthalate oil absorption can be determined as an amount of DBP (dibutyl phthalate) absorbed by 100 g of the carbon black based on JIS K6221.

In the present embodiment, the BET specific surface area by the nitrogen adsorption method and the dibutyl phthalate oil absorption of a carbon black are properties of the carbon black in the resin composition. These can be checked by extracting and measuring the carbon black in the resin composition. A specific method of extracting the carbon black from the resin composition is not especially limited, but an example thereof includes a method of incinerating the resin composition in an oxygen-free environment at 600 to 650° C. for 2 to 4 hours.

In the present embodiment, the lower limit of the BET specific surface area by the nitrogen adsorption method of the carbon black in the resin composition is 20 $m^2/g$; a preferable lower limit is 30 $m^2/g$; a more preferable lower limit is 40 $m^2/g$; a still more preferable lower limit is 45 $m^2/g$; and a further still more preferable lower limit is 50 $m^2/g$. Further in the present embodiment, the upper limit of the BET specific surface area by the nitrogen adsorption method of the carbon black in the resin composition is 150 $m^2/g$; a preferable upper limit is 140 $m^2/g$; a more preferable upper limit is 130 $m^2/g$, a still more preferable upper limit is 100 $m^2/g$; a further still more preferable upper limit is 90 $m^2/g$; and an especially preferable upper limit is 80 $m^2/g$. When the BET specific surface area by the nitrogen adsorption method of the carbon black in the resin composition is the above lower limit or more, the resin composition better in the dimensional stability can be obtained. Further when the BET specific surface area by the nitrogen adsorption method of the carbon black in the resin composition is the above upper limit or less, the deterioration of the flowability and the like of the resin composition can be prevented.

In the present embodiment, the lower limit of the dibutyl phthalate (DBP) oil absorption of the carbon black in the resin composition is 100 mL/100 g; a preferable lower limit is 120 mL/100 g; and a more preferable lower limit is 140 mL/100 g. Further in the present embodiment, the upper limit of the dibutyl phthalate (DBP) oil absorption of the carbon black in the resin composition is 300 mL/100 g; a preferable upper limit is 280 mL/100 g; and a still more preferable upper limit is 260 mL/100 g. When the dibutyl phthalate (DBP) oil absorption of the carbon black in the resin composition is the above lower limit or more, the resin composition better in the dimensional stability can be obtained. Further when the dibutyl phthalate (DBP) oil absorption of the carbon black in the resin composition is the above upper limit or less, the deterioration of the flowability and the like of the resin composition can be prevented.

In the present embodiment, the ratio (specific surface area/oil absorption) of the BET specific surface area (unit: $m^2/g$) to the dibutyl phthalate (DBP) oil absorption (unit: mL/100 g) of the carbon black in the resin composition is preferably 1.0 or less, more preferably 0.8 or less, and still more preferably 0.6 or less. A carbon black having a lower ratio thereof (specific surface area/oil absorption) is likely to have a lower pore volume and porosity; thereby, molded articles better in both the dimensional precision and the durability can be obtained.

In the present embodiment, the BET specific surface area by the nitrogen adsorption method and the dibutyl phthalate oil absorption of the carbon black are properties of the carbon black in the resin composition, and a method of setting the properties in the above ranges includes a method of appropriately selecting a carbon black as a raw material by reference to the properties. The properties of carbon blacks as a raw material are information disclosed by carbon black makers; a carbon black as a raw material is appropriately selected based on the information, and the properties of the carbon black in the resin composition can be set in the above ranges.

In the present embodiment, the resin composition in which the BET specific surface area by the nitrogen adsorption method and the dibutyl phthalate oil absorption of the carbon black are in the above-mentioned specific ranges can be obtained by appropriately selecting the carbon black as a raw material as described above, and suitably setting the processing condition of the resin composition so as to maintain the properties of the carbon black also in the resin composition. As described later, the polyacetal resin composition according to the present embodiment can be obtained by melting and kneading by using a twin-screw extruder; and for example, in the case of using a carbon black having a BET specific surface area of about 50 $m^2/g$ as a raw material, if the kneading condition is too strong, since the BET specific surface area of the carbon black in the resin composition becomes small, the BET specific surface area of the carbon black in the resin composition can be regulated, for example, by a method of reducing the rotation frequency of the screws according to the common knowledge of those skilled in the art. Also by adjusting the Q/N (Q: output rate, N: rotation number of screw) commonly used as an energy received by a resin in melting and kneading, the BET specific surface area of the carbon black in the resin composition can be regulated.

This is similar also in the dibutyl phthalate oil absorption of the carbon black in the resin composition, and by appropriately varying the processing condition of the resin composition, the dibutyl phthalate oil absorption of the carbon black in the resin composition can be adjusted.

In the resin composition according to the present embodiment, the content of the carbon black is 10% by mass or more, preferably 12% by mass or more, and more preferably 14% by mass or more. Further in the resin composition according to the present embodiment, the upper limit of the content of the carbon black is preferably 40% by mass, more preferably 35% by mass, still more preferably 30% by mass, further still more preferably 25% by mass, and especially preferably 20% by mass. When the content of the carbon black is the above lower limit or more, the resin composition can develop a stable electroconductivity, and can maintain the dimensional stability. When the content of the carbon black is the above upper limit or less, the decrease of the flowability of the resin composition can be prevented.

The resin composition according to the present embodiment has a content of the carbon black, which is a constituting component, of at least 10% by mass as described above. This is because the dibutyl phthalate oil absorption of the carbon black to be used in the present embodiment is set in a smaller special range than that of carbon blacks usually used. That is, the resin composition according to the present embodiment, in order to make a high electroconductivity to be exhibited, contains a larger amount of carbon black than conventionally. Polyacetal resin compositions containing a large amount of carbon black are generally likely to be inferior in the moldability and the flowability. The resin composition according to the present embodiment, however, since the above-mentioned polyacetal resin having a specific molecular weight distribution is used as a constituting component, can have a high electroconductivity without exhibiting the decrease in the moldability and the flowability even if a large amount of the carbon black is contained.

[Epoxy Compound]

The polyacetal resin composition according to the present embodiment can further contain an epoxy compound. The epoxy compound is not especially limited, but is preferably specifically a compound having an epoxy group(s) formed by oxidizing a monoglycidyl derivative, a polyfunctional glycidyl derivative or a compound having an unsaturated bond(s).

The epoxy compound is not especially limited, but specific examples thereof include 2-ethylhexyl glycidyl ether, 2-methyloctyl glycidyl ether, lauryl glycidyl ether, stearyl glycidyl ether, behenyl glycidyl ether, ethylene glycol diglycidyl ether, polyethylene glycol diglycidyl ether (units of ethylene oxide: 2 to 30), propylene glycol diglycidyl ether, (units of propylene oxide: 2 to 30), neopentyl glycol diglycidyl ether, 1,6-hexanediol diglycidyl ether, glycerol diglycidyl ether, glycerol triglycidyl ether, trimethylolpropane diglycidyl ether, trimethylolpropane triglycidyl ether, bisphenol A diglycidyl ether, hydrogenated bisphenol A diglycidyl ether, sorbitan monoester diglycidyl ether, sorbitan monoester triglycidyl ether, pentaerythritol triglycidyl ether, pentaerythritol tetraglycidyl ether, diglycerol triglycidyl ether, diglycerol tetraglycidyl ether, condensates (epoxy equivalent: 100 to 400, softening point: 20 to 150° C.) of cresol novolac and epichlorohydrin, glycidyl methacrylate, coconut fatty acid glycidyl ester, and soybean fatty acid glycidyl ester.

These epoxy compounds may be used singly or in combinations of two or more.

Further in the resin composition according to the present embodiment, the lower limit amount of the epoxy compound is, with respect to 100% by mass of the total amount of the composition, preferably 0.5% by mass, and more preferably 1% by mass. Further in the resin composition according to the present embodiment, the upper limit amount of the epoxy compound is, with respect to 100% by mass of the total amount of the composition, preferably 10% by mass, and more preferably 5% by mass.

When the lower limit amount of the epoxy compound is the above amount or more, the amount of formaldehyde generated in heating of the resin composition can be more suppressed, and mold deposits in molding can be more suppressed. Further when the upper limit amount of the epoxy compound is the above amount or less, the decrease of the flowability of the resin composition can be more suppressed.

[Epoxy Resin Curing Additive]

The resin composition according to the present embodiment can further contain an epoxy resin curing additive. As the epoxy resin curing additive, for example, basic nitrogen compounds and basic phosphorus compounds are usually used, but other compounds having an epoxy curing action (including curing accelerating action) can be all used.

The epoxy resin curing additive is not especially limited, but specific examples thereof include imidazole; substituted imidazoles such as 1-hydroxyethyl-2-methylimidazole, 1-cyanoethyl-2-heptadecylimidazole and 1-vinyl-2-phenylimidazole; aliphatic secondary amines such as octylmethylamine and laurylmethylamine; aromatic secondary amines such as diphenylamine and ditolylamine; aliphatic tertiary amines such as trilaurylamine, dimethyloctylamine, dimethylstearylamine and tristearylamine; aromatic tertiary amines such as tritolylamine and triphenylamine; morpholine compounds such as cetylmorpholine, octylmorpholine, P-methylbenzylmorpholine; alkylene oxide adducts (addition molar number: 1 to 20 mol) to dicyandiamide, melamine, urea or the like; phosphorus compounds such as triphenylphosphine, methyldiphenylphosphine and tritolylphosphine.

These epoxy resin curing additives may be used singly or in combinations of two or more.

Further in the resin composition according to the present embodiment, the lower limit amount of the epoxy resin curing additive is, with respect to 100% by mass of the total amount of the composition, preferably 0.05% by mass, and more preferably 0.5% by mass. Further in the resin composition according to the present embodiment, the upper limit amount of the epoxy resin curing additive is, with respect to 100% by mass of the total amount of the composition, preferably 5% by mass, and more preferably 3% by mass.

When the lower limit amount of the epoxy resin curing additive is the above amount or more, the amount of formaldehyde generated in heating of the resin composition can be more suppressed, and mold deposits in molding can be more suppressed. Further when the upper limit amount of the epoxy resin curing additive is the above amount or less, the odor of the resin composition in molding processing can be suppressed.

[Olefinic Resin]

The polyacetal resin composition according to the present embodiment can further contain an olefinic resin. The olefinic resin is not especially limited, but specific examples thereof include polyethylenes (high density polyethylenes, medium density polyethylenes, and high-pressure low density polyethylenes, linear low density polyethylenes, ultralow density polyethylenes), polypropylenes, ethylene-propylene copolymers, ethylene-butene copolymers, polypropylene-butene copolymers, polybutenes, hydrogenated polybutadienes, ethylene-acrylate ester copolymers, ethylene-methacrylate ester copolymers, ethylene-acrylic acid copolymers and ethylene-vinylacetate copolymers. Modified olefinic resins are not especially limited, but specific examples thereof include graft copolymers thereof grafted with one or more other vinyl compounds; olefinic resins modified with an $\alpha,\beta$-unsaturated carboxylic acid (acrylic acid, methacrylic acid, maleic acid, fumaric acid, itaconic acid, citraconic acid, and nadic acid or the like) or an acid anhydride thereof (as required, concurrently using a peroxide); and copolymers of an olefinic compound with an acid anhydride.

In the resin composition according to the present embodiment, in the case of incorporating an olefinic resin, the lower limit amount of the olefinic resin is preferably 1% by mass, and more preferably 2% by mass. Further in the resin composition according to the present embodiment, in the case of incorporating an olefinic resin, the upper limit amount of the olefinic resin is preferably 20% by mass, and more preferably 10% by mass.

When the lower limit amount of the olefinic resin is the above amount or more, the slidability against metal of the resin composition can be improved. Further when the upper limit amount of the olefinic resin is the above amount or less, the layer exfoliation phenomenon can be prevented.

[Alkaline Metals in the Resin Composition]

The content of alkaline metals in the resin composition according to the present embodiment is 1 to 150 ppm by mass. The lower limit of the content of the alkaline metals in the resin composition according to the present embodiment is preferably 2 ppm by mass, more preferably 5 ppm by mass, still more preferably 10 ppm by mass, and especially preferably 20 ppm by mass. The upper limit of the content of the alkaline metals in the resin composition according to the present embodiment is preferably 140 ppm by mass, more preferably 130 ppm by mass, still more preferably 125 ppm by mass, and especially preferably 120 ppm by mass.

When the lower limit of the content of the alkaline metals in the resin composition is made to be the above content or more, the dispersion in the electroconductivity among molded articles of the resin composition can be suppressed. When the upper limit of the content of the alkaline metals in the resin composition is made to be the above content or less, mold deposits in the resin composition can be suppressed.

The content of the alkaline metals in the resin composition can be checked, for example, by the following method. First, an appropriate amount of the resin composition is sampled, and the sample is incinerated in the presence of oxygen at a temperature of 600 to 650° C. for 2 to 3 hours to thereby obtain a residue. Thereafter, the residue is measured by ICP atomic emission spectroscopy to be thereby easily able to check the content of the alkaline metals in the resin composition.

In the present embodiment, the alkaline metals may be incorporated in the resin composition by any method. Examples of the method include a method of adding alkaline metal salts of fatty acids in the polyacetal resin composition, and a method of adding alkaline metals as one of impurities contained in carbon black and various types of additives. Among these, it is especially preferable that the alkaline metals are contained in carbon black. From the viewpoint of the thermal stability of the polyacetal resin, it is generally said to be preferable that the polyacetal resin includes no alkaline metals which would be likely to thermally decompose the polyacetal resin. The incorporation of the alkaline metals in carbon black, however, can more reduce the dispersion in the electroconductivity without the thermal stability being largely decreased. The amount of the alkaline metals contained in the carbon black can be determined by subjecting the carbon black to the above-mentioned ICP atomic emission spectroscopy.

[Generation Rate of Formaldehyde of the Resin Composition]

The resin composition according to the present embodiment preferably exhibits a generation rate of formaldehyde of 100 ppm by mass/min or less as generated during a heating time of from 10 min to 30 min when the composition is heated at 230° C.

The upper limit of the formaldehyde generation rate is more preferably 90 ppm by mass/min, still more preferably 80 ppm by mass/min, and especially preferably 70 ppm by mass/min. The lower limit of the formaldehyde generation rate is, since a lower formaldehyde generation rate is an indication showing being more stable, preferably zero, but is, if anything, 5 ppm by mass/min.

When the resin composition according to the present embodiment exhibits a formaldehyde generation rate of the above upper limit or less, the generation of mold deposits can be suppressed and the resin composition can be provided with such a high thermal stability that no problem occurs when molding is resumed after a long-time suspension of molding.

The formaldehyde generation rate of the resin composition can be determined by heating the polyacetal resin composition in a nitrogen gas flow (50 NL/hr) at 200° C. for 30 min or more, absorbing formaldehyde gas generated from the polyacetal resin in water, and thereafter titrating the water by the sodium sulfite method. An amount of formaldehyde generated from the initiation of the heating until after 10 min therefrom and an amount of formaldehyde generated from the initiation of the heating until after 30 min therefrom are measured, and the difference is converted to a value per unit time (min) to be thereby able to acquire the rate. This measurement, since being largely influenced by the time needed for melting, is preferably carried out by using a sample of a shape having a large surface area like pellets, as a measurement object. If the measurement is carried out by using a large lump, there arises a possibility that the formaldehyde generation rate is measured as a lower value than an actual one. A sample to be used in the measurement preferably has a size of 3 mm or less. In order to measure the generation rate of formaldehyde generated between 10 min and 30 min after the heating initiation of the sample, the sample is preferably cut or crushed into 3 mm or less.

In the resin composition according to the present embodiment, the generation rate of formaldehyde generated during a heating time of from 10 min to 30 min can be adjusted by the processing condition. For example, when the resin composition is produced by a twin-screw extruder, the generation rate can be adjusted by varying the adding positions of carbon black (for example, fed from a main throat, fed from a side feeder), varying the rotation number of the screw, varying the raw material feeds (for example, feeding carbon black together with a resin raw material to the extruder, feeding carbon black singly to the extruder), varying the raw material blends (presence/absence of an epoxy compound and an epoxy resin curing additive) and varying others. Specifically, with respect to the adding position of carbon black, the case where the carbon black is fed from the side feeder is likely to exhibit a lower generation rate of formaldehyde than the case where the carbon black is fed from the main throat; and the case where the rotation number of the screw is lower is likely to exhibit a lower generation rate of formaldehyde. Further the case where the carbon black is fed together with the resin raw material to the extruder is likely to exhibit a lower generation rate of formaldehyde than the case where the carbon black is fed singly to the extruder. Further, use of an epoxy compound as a raw material enables the generation rate of formaldehyde to be suppressed low, and further addition of an epoxy resin curing additive further enables the generation rate of formaldehyde to be suppressed low.

[Volume Specific Resistance of the Resin Composition]

The upper limit of the volume specific resistance of the resin composition according to the present embodiment is preferably 100 Ω·cm, more preferably 80 Ω·cm, still more preferably 60 Ω·cm, and especially preferably 50 Ω·cm. The lower limit of the volume specific resistance of the resin composition according to the present embodiment is preferably 0.1 Ω·cm, more preferably 0.5 Ω·cm, and still more preferably 1 Ω·cm. When the upper limit of the volume specific resistance is the above value or less, a stable electroconductivity as the resin composition can be secured. Further when the lower limit of the volume specific resistance is the above value or more, the flowability of the resin composition can be held.

[Melt Flow Rate of the Resin Composition]

The melt flow rate (MFR) of the resin composition according to the present embodiment is preferably less than 8 g/10 min, more preferably 0.1 to 5 g/10 min, and still more preferably 0.5 to 3 g/10 min. When the MFR of the resin composition according to the present embodiment is in the above range, since the dispersibility of the carbon black in the resin composition is improved, the electroconductivity is likely to become better.

A method for controlling the melt flow rate (MFR) of the resin composition in the above range is not especially limited, but examples thereof include a method of incorporating a polyacetal resin having an MFR in the above-mentioned range in the above-mentioned specific range as a raw material, a method of adjusting the amount of carbon black blended, and a method of adjusting the rotation number of the screw of the extruder in production.

In the present embodiment, the MFR of the resin composition can be measured according to JIS K7210 under the condition of a test temperature of 190° C. and a test load of 2.16 kg.

[Heat Stabilizer]

The polyacetal resin composition according to the present embodiment can contain, as required, one or two or more heat stabilizers.

The heat stabilizer is not especially limited, but suitable are, for example, an antioxidant, a scavenger of formaldehyde and formic acid, and a combination thereof.

The antioxidant is not especially limited, but specifically, a hindered phenolic antioxidant is preferable.

The hindered phenolic antioxidant is not especially limited, but specific examples thereof include n-octadecyl-3-(3',5'-di-t-butyl-4'-hydroxyphenyl)-propionate, n-octadecyl-3-(3'-methyl-5'-t-butyl-4'-hydroxyphenyl)-propionate, n-tetradecyl-3-(3',5'-di-t-butyl-4'-hydroxyphenyl)-propionate, 1,6-hexanediol-bis-(3-(3,5-di-t-butyl-4-hydroxyphenyl)-propionate), 1,4-butanediol-bis-(3-(3,5-di-t-butyl-4-hydroxyphenyl)-propionate), triethylene glycol-bis-(3-(3-t-butyl-5-methyl-4-hydroxyphenyl)-propionate), tetrakis-(methylene-3-(3',5'-di-t-butyl-4'-hydroxyphenyl)propionate)methane, 3,9-bis(2-(3-(3-t-butyl-4-hydroxy-5-methylphenyl)propionyloxy)-1,1-dimethylethyl)-2,4,8,10-tetraoxaspiro(5.5)undecane, N,N'-bis-3-(3',5'-di-t-butyl-4-hydroxyphenol)propionylhexamethylenediamine, N,N'-tetramethylenebis-3-(3'-methyl-5'-t-butyl-4-hydroxyphenol)propionyldiamine, N,N'-bis-(3-(3,5-di-t-butyl-4-hydroxyphenol)propionyl)hydrazine, N-salicyloyl-N'-salicylidenehydrazine, 3-(N-salicyloyl)amino-1,2,4-triazole, and N,N'-bis(2-(3-(3,5-di-butyl-4-hydroxyphenyl)propionyloxy)ethyl)oxyamide.

Among the above-mentioned hindered phenolic antioxidants, preferable are triethylene glycol-bis-(3-(3-t-butyl-5-methyl-4-hydroxyphenyl)-propionate) and tetrakis-(methylene-3-(3',5'-di-t-butyl-4'-hydroxyphenyl)propionate)methane.

The scavenger of formaldehyde and formic acid is not especially limited, but specific examples thereof include compounds and polymers containing a formaldehyde-reactive nitrogen, and hydroxides, inorganic acid salts and carboxylate salts of alkaline metals or alkaline earth metals. The compounds and polymers containing a formaldehyde-reactive nitrogen are not especially limited, but specific examples thereof include dicyandiamide, melamine or cocondensates of melamine and formaldehyde; polyamide resins such as nylon 4-6, nylon 6, nylon 6-6, nylon 6-10, nylon 6-12, nylon 12, nylon 6/6-6, nylon 6/6-6/6-10 and nylon 6/6-12; and poly-β-alanine and polyacrylamide. Among these, preferable are cocondensates of melamine and formaldehyde, polyamide resins, poly-β-alanine and polyacrylamide; and more preferable are polyamide resins and poly-β-alanine.

The hydroxides, inorganic acid salts and carboxylate salts of alkaline metals and alkaline earth metals are not especially limited, but specific examples thereof include hydroxides of sodium, potassium, magnesium, calcium or barium, and carbonate salts, phosphate salts, silicate salts, borate salts, and carboxylate salts of the above metals.

Among these, calcium salts are preferable. The calcium salts are not especially limited, but specific examples thereof include calcium hydroxide, calcium carbonate, calcium phosphate, calcium silicate, calcium borate and fatty acid calcium salts (calcium stearate, calcium myristate and the like), and these fatty acids may be substituted with a hydroxyl group(s). Among these, more preferable are fatty acid calcium salts (calcium stearate, calcium myristate and the like).

A preferable combination of the heat stabilizers is particularly that of a hindered phenolic antioxidant represented by triethylene glycol-bis-(3-(3-t-butyl-5-methyl-4-hydroxyphenyl)-propionate) or tetrakis-(methylene-3-(3',5'-di-t-butyl-4'-hydroxyphenyl)propionate)methane particularly with a polymer containing a formaldehyde-reactive nitrogen represented by a polyamide resin and poly-β-alanine and particularly with a fatty acid salt of an alkaline earth metal represented by a fatty acid calcium salt.

The content of each heat stabilizer is: with respect to 100 parts by mass of the polyacetal resin, it is preferable that a hindered phenolic antioxidant is in the range of 0.1 to 2 parts by mass; a polymer containing a formaldehyde-reactive nitrogen is in the range of 0.1 to 3 parts by mass; and a fatty acid salt of an alkaline earth metal is in the range of 0.1 to 1 parts by mass.

[Other Components]

The polyacetal resin composition according to the present embodiment, as desired, can further contain various types of additives which are conventionally used for polyacetal resins. The additives are not especially limited, but examples thereof include inorganic fillers, crystal nucleating agents, electroconductive materials, thermoplastic resins, thermoplastic elastomers, and pigments.

The inorganic fillers are not especially limited, but specifically used are, for example, fibrous, granular, platy and hollow fillers.

The fibrous fillers are not especially limited, but specific examples thereof include inorganic fibers such as glass fibers, carbon fibers, silicone fibers, silica-alumina fibers, zirconia fibers, boron nitride fibers, silicon nitride fibers, boron fibers, potassium titanate fibers and further metal fibers of stainless steel, aluminum, titanium, copper, brass and the like. Examples thereof also include whiskers of short-fiber potassium titanate whiskers, zinc oxide whiskers and the like. Further there can also be used high-melting point organic fibrous substances of aromatic polyamide resins, fluororesins, acryl resins, and the like.

The granular fillers are not especially limited, but specific examples thereof include silicate salts such as silica, quartz powders, glass beads, glass powders, calcium silicate, aluminum silicate, kaolin, clay, diatomaceous earth and wollastonite, metal oxides such as iron oxide, titanium oxide and alumina, metal sulfate salts such as calcium sulfate and barium sulfate, carbonate salts such as magnesium carbonate and dolomite, and additionally silicon carbide, silicon nitride, boron nitride, and various metal powders.

The platy fillers are not especially limited, but specific examples thereof include mica, glass flakes and various metal foils.

The hollow fillers are not especially limited, but specific examples thereof include glass balloons, silica balloons, shirasu balloons and metal balloons. These fillers can be used singly or concurrently in two or more. Either of surface-treated fillers thereof and non-surface-treated fillers thereof can be used, but the use of the surface-treated fillers is better in some cases from the viewpoint of the smoothness of the molding surface and the mechanical properties. As a surface treating agent, a conventionally well-known one can be used. There can be used, for example, various types of coupling agents of silane-based, titanate-based, aluminum-based and zirconium-based ones. Specific examples thereof include N-(2-aminoethyl)-3-aminopropyltriethoxysilane, 3-glycidoxypropyltrimethoxysilane, isopropyltrisstearoyl titanate, diisopropoxyammonium ethyl acetate, and n-butyl zirconate.

The crystal nucleating agents are not especially limited, but a specific example thereof includes boron nitride.

The electroconductive agents are not especially limited, but specific examples thereof include graphite, carbon fibers, carbon nanotubes and metal powders or fibers. As described above, in the resin composition according to the present embodiment, the carbon black as a constituting component has specific properties. A well-known carbon black may be contained as long as meeting the property ranges.

The thermoplastic resins are not especially limited, but examples thereof include acryl resins, styrene resins and polycarbonate resins, and also modified substances thereof.

The thermoplastic elastomers are not especially limited, but specific examples thereof include polyurethane-based elastomers, polyester-based elastomers, polystyrene-based elastomers and polyamide-based elastomers.

The pigments are not especially limited, but specific examples thereof include inorganic pigments, organic pigments, metallic pigments and fluorescent pigments. The inorganic pigments refer to ones usually used as inorganic pigments for coloring resins. The inorganic pigments are not especially limited, but examples thereof include zinc sulfide, titanium oxide, barium sulfate, Titanium Yellow, Cobalt Blue, calcined pigments, carbonate salts, phosphate salts, acetate salts, carbon black, acetylene black and lamp black. The organic pigments are not especially limited, but examples thereof include condensed azo-based, imine-based, phthalocyanine-based, monoazo-based, diazo-based, polyazo-based, anthraquinone-based, heterocyclic-based, perinone-based, quinacridone-based, thioindigo-based, perylene-based, dioxazine-based and phthalocyanine-based pigments. The addition proportion of pigments, since largely varying depending on the color, is difficult to define, but generally, is preferably in the range of 0.05 to 5 parts by mass with respect to 100 parts by mass of the polyacetal resin.

[Method for Producing the Polyacetal Resin Composition]

An apparatus of producing the polyacetal resin composition according to the present embodiment is not especially limited, but for example, a usually practically used kneader can be applied. The kneader is not especially limited, but there may be used, for example, a single-screw or multi-screw kneading extruder, a roll or a Banbury mixer. Among these, more preferable is a twin-screw extruder capable of being equipped with a pressure-reduction apparatus and a side-feeder facility. Examples of melting and kneading methods include a method of continuously feeding each raw material component from a main throat of an extruder and melting and kneading the mixture, and a method of dividing and adding each raw material component to the main throat and a side feeder installed on a side of the extruder, and melting and kneading the mixture. Among these, preferable methods are a method of adding carbon black to the side feeder and raw material components other than it to the main throat, and melting and kneading the mixture, and a method of adding the carbon black to the side feeder and appropriately dividing and adding raw material components other than it to the main throat and the side feeder, and melting and kneading the mixture.

Hereinafter, melting and kneading using an extruder will be described, but every condition in melting and kneading is selected from the viewpoint of controlling the kneading condition in a comparatively mild one so that the carbon black in the resin composition has the above-mentioned specific properties.

In order to effectively remove volatile components and decomposed formaldehyde in the resin composition in extrusion, a vent is preferably put in a reduced pressure state. The pressure of the vent interior at this time is not especially limited, but is preferably in the range of 0 to 0.07 MPa. The resin temperature of the resin composition in kneading is preferably a temperature higher by 1 to 100° C. than the melting point, as determined by a differential scanning calorimetry (DSC) according to JIS K7121, of a polyacetal resin to be used. More specifically, the resin temperature is preferably controlled in the range of 160° C. to 240° C., and more preferably controlled in the range of 170° C. to 230° C. The resin temperature can be controlled by the setting temperature, the rotation number of the screw and the extrusion amount per hour (hereinafter, simply referred to as "output rate" in some cases) of an extruder. The resin temperature mentioned here can be checked by measuring directly the temperature of the melted resin discharged from a die of the extruder by using a thermocouple. A preferable rotation number of the screw of the extruder is not especially limited, but the rotation number of the screw is preferably 100 rpm or more and 500 rpm or less, and more preferably 130 rpm or more and 400 rpm or less. The rotation number of the screw at this time is more preferably controlled so that the above-mentioned resin temperature falls in the preferable range. Further the average retention time of the resin in the extruder is not especially limited, but is preferably 30 sec to 1 min. The average retention time of the resin mentioned here can be controlled by the rotation number of the screw of the extruder and the output rate. Further a preferable ratio (Q/N) of a output rate (Q, unit: kg/h) to a rotation number of a screw (N, unit: rpm) of the extruder is preferably adjusted so that the above-mentioned resin temperature falls in the preferable range.

A specific value of the ratio (Q/N) thereof is, for example, in the case of the extruder having a screw diameter of 40 to 50 mm, preferably 0.7 or more; in the case of the extruder having a screw diameter of 50 to 60 mm, preferably 1.0 or more; and in the case of the extruder having a screw diameter exceeding 60 mm, more preferably 1.5 or more.

[Molded Article]

The molded article according to the present embodiment contains the above-mentioned resin composition. The molded article according to the present embodiment can be obtained, for example, by molding the above-mentioned resin composition. A method for molding the above-mentioned resin composition is not especially limited, and includes well-known molding methods, for example, extrusion molding, injection molding, vacuum molding, blow molding, injection compression molding, decorative molding, multi-material molding, gas-assisted injection molding, expansion injection molding, low-pressure molding, ultra-thin-wall injection molding (ultrahigh-speed injection molding), and in-mold composite molding (insert molding and out-sert molding).

[Applications]

The application of the molded articles according to the present embodiment is not limited to the following, but the molded articles can suitably be used as internal parts of copying machines and the like, internal parts of camera and video devices, internal parts of drives of optical discs, internal parts of navigation systems for cars, internal parts of mobile type music and video players, internal parts of communication devices such as mobile phones and facsimiles, internal parts (for example, lamps and latches) of hard disk drives, and door-related internal parts represented by car window regulators, which all are mechanism parts represented by cams, sliders, levers, arms, clutches, felt clutches, idler gears, pulleys, rolls, rollers, key stems, key tops, shutters, reels, shafts, joints, spindles, bearings, guides, and the like, additionally, seat belt circumferential parts represented by slip rings, press buttons and the like for seat belts, combination switch parts, switch and clip parts, drain plug opening/closing mechanism parts of washstands and drain ports, opening/closing part locking mechanism parts, goods discharging mechanism parts and other internal parts of automatic vending machines, and industrial parts represented by toys, fasteners, chains, conveyors, buckles, sporting goods, furniture, musical instruments, and housing facilities and devices. Among these, the molded articles can suitably be used particularly as injection-molded gears, copying machine drum gears or flanges of photoreceptor drums in image forming devices.

EXAMPLES

Hereinafter, the present invention will be described more specifically by way of Examples and Comparative Examples, but the present invention is not anymore limited thereto.

Components used in the present Examples will be described hereinafter.

[Polyacetal Resins]

(POM-1)

A polyoxymethylene copolymer obtained according to a method described in Examples of International Publication No. WO2013/108834. The polyoxymethylene copolymer contained 1,3-dioxolane (1,3-dioxolane of 3.9 mol % with respect to 1 mol of trioxane) as a comonomer, and had a melt flow rate of 11 g/10 min, a weight-average molecular weight (Mw) of 154,000 and an amount of components having a molecular weight of less than 10,000 of 8.9% by mass, and exhibited two peaks (bimodal) in a chart acquired by a gel permeation chromatography (GPC) measurement.

(POM-2)

A polyoxymethylene copolymer obtained according to a method described in Examples of International Publication No. WO2013/108834. The polyoxymethylene copolymer contained 1,3-dioxolane (1,3-dioxolane of 3.9 mol % with respect to 1 mol of trioxane) as a comonomer, and had a melt flow rate of 45 g/10 min, a weight-average molecular weight (Mw) of 52,000 and an amount of components having a molecular weight of less than 10,000 of 10.8% by mass, and exhibited two peaks (bimodal) in a chart acquired by a gel permeation chromatography (GPC) measurement.

(POM-3)

A polyoxymethylene copolymer obtained according to a method described in Examples of Japanese Patent Laid-Open No. 9-59332. The polyoxymethylene copolymer contained 1,3-dioxolane (1,3-dioxolane of 3.9 mol % with respect to 1 mol of trioxane) as a comonomer, and had a melt flow rate of 10 g/10 min, a weight-average molecular weight (Mw) of 160,000 and an amount of components having a molecular weight of less than 10,000 of 3.5% by mass, and exhibited two peaks (bimodal) in a chart acquired by a gel permeation chromatography (GPC) measurement.

(POM-4)

A polyoxymethylene copolymer obtained according to a method described in Examples of Japanese Patent Laid-Open No. 8-208786. The polyoxymethylene copolymer contained 1,3-dioxolane (1,3-dioxolane of 3.9 mol % with respect to 1 mol of trioxane) as a comonomer, and had a melt flow rate of 11 g/10 min, a weight-average molecular weight (Mw) of 171,000 and an amount of components having a molecular weight of less than 10,000 of 2.0% by mass, and exhibited one peak (monomodal) in a chart acquired by a gel permeation chromatography (GPC) measurement.

In the present Examples, the melt flow rate of the polyacetal resins was measured according to JIS K7210 under the condition of a test temperature of 190° C. and a test load of 2.16 kg. The molecular weight of the polyacetal resins was measured by a gel permeation chromatography (carrier solvent: hexafluoroisopropanol, standard substance: polymethyl methacrylate).

[Carbon Blacks]

(CB-1)

An electroconductive carbon black having a BET specific surface area by the nitrogen adsorption method of 51 $m^2/g$, and a dibutyl phthalate oil absorption of 180 mL/100 g. The electroconductive carbon black had a content of alkaline metals of 680 ppm by mass.

(CB-2)

An electroconductive carbon black prepared by washing CB-1 with a 1N-hydrochloric acid (containing 1% by mass of ethanol), and thereafter repeatedly washing the CB-1 with a 1% by mass of ethanol-containing water. The electroconductive carbon black had a content of alkaline metals of the detection limit or less.

(CB-3)

An electroconductive carbon black having a BET specific surface area by the nitrogen adsorption method of 65 $m^2/g$, and a dibutyl phthalate oil absorption of 190 mL/100 g. The electroconductive carbon black had a content of alkaline metals of the detection limit or less.

(CB-4)

An electroconductive carbon black having a BET specific surface area by the nitrogen adsorption method of 800 $m^2/g$, and a dibutyl phthalate oil absorption of 360 mL/100 g. The electroconductive carbon black had a content of alkaline metals of 10 ppm by mass.

In the present Examples, the content of alkaline metals was measured by a radio-frequency inductively coupled plasma (ICP) atomic emission spectroscopy. The BET specific surface area by the nitrogen adsorption method was determined by the BET expression from a nitrogen adsorption based on JIS K6217. Further the dibutyl phthalate oil absorption was determined as an amount of DBP (dibutyl phthalate) absorbed by 100 g of carbon black, based on JIS K6221.

[Other Components]

(Epoxy Compound)

A condensate (epoxy equivalent=350, softening point=80° C., made by Asahi Kasei E-materials Corp., product name: ECN1299) of a cresol novolac with epichlorohydrin.

(Phosphorus-Based Compound)

Triphenylphosphine (made by HOKKO CHEMICAL INDUSTRY CO., LTD.).

(Olefinic Polymer)

A high-density polyethylene having a melt flow rate (MFR) of 5 g/10 min (Code D of JIS K7210) (made by Asahi Kasei Chemicals Corp., product name: Suntec J240).

[Method for Producing the Polyacetal Resin Compositions]

In the present Examples, the polyacetal resin compositions were all produced by using a corotation twin-screw extruder (TEM48SS, screw diameter: 48 mm). FIG. 1 shows a schematic diagram of a twin-screw extruder used in the present Examples.

The twin-screw extruder had an L/D of 58, and the number of temperature-controlled barrels of 13 barrels; in the case where a main throat section was used as a first barrel, the extruder was so made that screw-type forced feed units (side feeders) were capable of being connected to a seventh barrel and a tenth barrel from the extruder side, and raw materials were capable of being fed from these barrels to the extruder.

The twin-screw extruder was further so made that openings were capable of being provided on upper parts of a fifth barrel and a 13th barrel, and an open vent and a vacuum vent were capable of being installed at the respective openings.

<Production Method A>

Raw materials were all fed to the twin-screw extruder from the main throat by so adjusting that the total feed amount (output rate: Q) became 200 kg/h. The polyacetal resin composition was melted and kneaded in the twin-screw extruder under the condition (Q/N=0.83) of a rotation number of a screw (N) of 240 rpm, extruded in strand form, and cooled with water and cut to thereby obtain a sample as pellets. The components other than the carbon black were all previously mixed and made into a mixture, which was added to the twin-screw extruder by a feed unit different from a feed unit of the carbon black.

The cylinder temperature at this time was set such that the first barrel was cooled with water; from the second barrel to the sixth barrel were set at 220° C.; from the seventh barrel to the 14th barrel were set at 190° C.; and the die temperature was set at 210° C. No side feeder was connected to the extruder, and a vacuum vent was installed at the 13th barrel and vacuum suction was carried out.

<Production Method A2>

The production was carried out as in Production Method A, only except for altering the rotation number of the screw to 300 rpm (Q/N=0.67).

<Production Method A3>

The production was carried out as in Production Method A, only except for altering the rotation number of the screw to 120 rpm (Q/N=1.67).

<Production Method B>

The production was carried out as in Production Method A, only except for installing a side feeder at the seventh barrel, and feeding the carbon black alone from the side feeder of the seventh barrel and all the mixture of the components other than the carbon black from the main throat to the twin-screw extruder by so adjusting that the total feed amount (output rate) became 200 kg/h (Q/N=0.83).

<Production Method B2>

The production was carried out as in Production Method B, only except for altering the rotation number of the screw to 300 rpm (Q/N=0.67).

<Production Method C>

The production was carried out as in Production Method B, except for feeding all of the carbon black and 50% by mass (here, the total amount of the mixture of the components other than the carbon black was taken to be 100% by mass) of the mixture of the components other than the carbon black from the side feeder of the seventh barrel to the twin-screw extruder, and feeding the rest of the mixture of the components other than the carbon black from the main throat to the twin-screw extruder.

<Production Method C2>

The production was carried out as in Production Method C, only except for altering the rotation number of the screw to 300 rpm (Q/N=0.67).

<Production Method C3>

The production was carried out as in Production Method C, except for altering the rotation number of the screw to 350 rpm (Q/N=0.57).

<Production Method C4>

The production was carried out as in Production Method C, only except for feeding all of the carbon black and 30% by mass (here, the total amount of the components other than the carbon black was taken to be 100% by mass) of the mixture of the components other than the carbon black from the side feeder of the seventh barrel to the twin-screw extruder, and feeding the rest of the mixture of the components other than the carbon black from the main throat to the twin-screw extruder.

<Production Method C5>

The production was carried out as in Production Method C4, only except for altering the rotation number of the screw to 300 rpm (Q/N=0.67).

<Production Method D>

The production was carried out as in Production Method A, except for installing a side feeder at the tenth barrel, and feeding all of the carbon black and 50% by mass (here, the total amount of the mixture of the components other than the carbon black was taken to be 100% by mass) of the mixture of the components other than the carbon black from the side feeder of the tenth barrel to the twin-screw extruder, and feeding the rest of the mixture of the components other than the carbon black from the main throat to the twin-screw extruder.

[Measurement of the Molecular Weight Distribution of the Polyacetal Resin in the Resin Composition]

5 g of the obtained pellets of the resin composition was taken, and dissolved in 200 mL of hexafluoroisopropanol; the undissolved fraction was filtered out; and a solution part was then collected. By using the obtained solution, the molecular weight of the polyacetal resin in the resin composition was measured by using a gel permeation chromatography (GPC) instrument [LC-8120GPC, made by TOSOH CORPORATION] and using hexafluoroisopropanol as a carrier solvent.

In the measurement of the molecular weight, a differential refractometer was used as a detector. Further as the calibration curve, a calibration curve acquired by using polymethyl methacrylate (PMMA) as the standard substance was used. Further the amount of components having a molecular weight in terms of PMMA of less than 10,000 in the polyacetal resin in the resin composition was calculated. Further in a chart acquired in the GPC measurement, it was visually checked whether or not a range of the molecular weight of less than 10,000 and a range of the molecular weight of 10,000 or more each exhibited at least one peak.

[Content of Alkaline Metals in the Resin Composition]

10 g of the obtained pellets of the resin composition was put in a crucible, and incinerated in an electric oven at 600° C. for 2 hours. After cooling, a residue in the crucible was taken out, and the content of alkaline metals in the residue was measured by ICP atomic emission spectroscopy. The measurement value was taken as a content of alkaline metals in the resin composition.

[The BET Specific Surface Area and the Dibutyl Phthalate Oil Absorption of the Carbon Black in the Resin Composition]

The obtained pellets of the resin composition was put in a crucible with a lid, and incinerated in a nitrogen atmosphere at 650° C. for 3 hours. For a residue (carbon black) obtained in the crucible, the BET specific surface area was measured from a nitrogen adsorption based on JIS K6217. Further for the residue (carbon black), the dibutyl phthalate (DBP) oil absorption was determined based on JIS K6221.

[The Volume Specific Resistance Average Value, the Volume Specific Resistance Standard Deviation and the Volume Specific Resistance Variation Coefficient]

A sample was collected at every 5 min in the extrusion by the above-mentioned each Production Method, to thereby collect 10 samples (each of the pellets of the resin composition).

The collected pellets of the resin composition were molded by using an EC-75NII molding machine, made by TOSHIBA MACHINE CO., LTD. under the injection condition of a cylinder temperature set at 205° C., a mold temperature set at 90° C., an injection time of 35 sec and a cooling time of 15 sec, to thereby obtain a polyacetal resin molded article of a multi-purpose test piece shape according to ISO294-1.

The polyacetal resin molded article of a multi-purpose test piece shape was cut out into a flat plate of 30 mm×20 mm×4 mm, which was used as a sample for the volume specific resistance measurement. The measurement of the volume specific resistance used a Loresta GP, made by Mitsubishi Chemical Corporation. The measurement of the volume specific resistance of the sample (flat plate) was carried out by using, as a probe, a 4-pin ASP probe (inter-pin distance: 5 mm, pin points: 0.37 mmR×4, spring pressure: 210 g/pin, adaptable to JIS K7194) under the condition of an impressed voltage of 90 V.

The average value of volume specific resistances of 10 samples (flat plates) was determined and taken as a volume specific resistance average value (VR-average). Further the standard deviation was calculated from each value of the volume specific resistances of the 10 samples (flat plates) and taken as a volume specific resistance standard deviation (VR-sigma). Still further, the value obtained by dividing the volume specific resistance standard deviation (VR-sigma) by the volume specific resistance average value (VR-average) was taken to be an index of a variation in the electroconductivity as a volume specific resistance variation coefficient (VR-variance). A lower volume specific resistance variation coefficient means a smaller dispersion in the electroconductivity, and specifically, in this case, when the volume specific resistance variation coefficient is about 0.5 or less, the dispersion in the electroconductivity can be said to be sufficiently small. By contrast, when the volume specific resistance variation coefficient exceeds 1.0, the dispersion in the electroconductivity can be said to be considerably large.

[Formaldehyde Generation Rate of the Resin Composition]

The obtained pellets of the resin composition were heated in a nitrogen gas flow (50 NL/h) at 230° C. for 30 min or more, and formaldehyde gas generated was allowed to be absorbed in water; and the amount of formaldehyde gas generated at each given time point was determined by continually titrating the water by the sodium sulfite method. The amounts of formaldehyde generated at 10 min and 30 min after the heating initiation were each determined, and the difference between the amounts was divided by 20 to thereby calculate a formaldehyde generation rate per unit time (min).

[Molding Resumability after a Long-Time Suspension of Molding]

The obtained pellets of the resin composition were molded by using an EC-75NII molding machine, made by TOSHIBA MACHINE CO., LTD. under the injection condition of a cylinder temperature set at 200° C., a mold temperature set at 50° C., an injection time of 35 sec and a cooling time of 15 sec, to thereby obtain a polyacetal resin molded article of a multi-purpose test piece shape according to ISO294-1. The molding was carried out in 10 shots, and thereafter, the molding machine was suspended; and after the suspension of a predetermined time, the molding was resumed and the generation situation of silver streaks to molded articles was checked. The checks of the generation situation of the silver streaks were carried out for suspension times of the molding machine of 15 min, 30 min, 45 min and 60 min. The time when the silver streaks emerged was taken as a limit time of molding resumption. A longer limit time was evaluated as better in the thermal stability.

The evaluation was not carried out at times exceeding the limit time. Further, the case where no silver streaks generated even with a suspension time of 60 min of the molding machine was evaluated as a limit time of "60 min or more". In Table, the case is indicated as "60<".

[Mold Deposits]

The obtained pellets of the resin composition were molded by using an EC-75NII molding machine, made by TOSHIBA MACHINE CO., LTD. under the injection condition of a cylinder temperature set at 205° C., a mold temperature set at 50° C., an injection time of 15 sec and a cooling time of 15 sec, to thereby obtain a polyacetal resin molded article of a small tensile bar shape according to ISO294-2. The molding was carried out 300 times continually. A molded article at the 300th shot was observed and the influence on the mold transfer due to mold deposits was then visually checked, and the mold deposits were evaluated in the following evaluation criteria.

A: there was no influence on the mold transfer to the molded article due to mold deposits.

B: defective mold transfer due to mold deposits was confirmed on a part of the molded article.

C: defective mold transfer due to mold deposits was confirmed on the entire surface of the molded article.

[Precision of a Gear]

The obtained pellets of the resin composition were molded by using an injection molding machine (trade name: "SH-75"), made by Sumitomo Heavy Industries, Ltd. under the condition of a cylinder temperature of 200° C. and a mold temperature of 80° C. to thereby fabricate a right-handed helical gear with a pitch diameter of 80 mm, a module of 1, a helix angle of 20°, a face width of 12 mm, a web thickness of 2 mm and the number of ribs of 12. The helical gear thus obtained was measured for the profile deviation and the helix deviations of four teeth at intervals of 90° according to JIS B1702-1 by using a gear precision tester made by Osaka Seimitsu Kikai Co., Ltd., and the measurements were taken as the gear precision. It was judged that a helical gear having lower numerical values (∥m) of the profile deviation and the helix deviations is better in precision.

[Melt Flow Rate of the Resin Composition]

The melt flow rate (MFR) of the resin composition was measured according to JIS K7210 under the condition of a test temperature of 190° C. and a test load of 2.16 kg.

Examples 1 to 14 and Comparative Examples 1 to 8

Each component was blended in a proportion indicated in Tables 1 and 2, and melted and kneaded by production methods described in Tables 1 and 2. Each extruded resin composition was made into pellets by a strand cutter. By using the obtained pellets of each resin composition, the various types of tests were carried out by the above-mentioned methods. The results are shown in Tables 1 and 2. Here, in Comparative Example 4, since no resin composition was obtained due to the extrusion being impossible, the various types of tests were not carried out. Further, since the resin composition obtained in Comparative Example 5 had low flowability, the measurement of MFR could not be carried out.

TABLE 1

|  | Unit | Ex. 1 | Ex. 2 | Ex. 3 | Ex. 4 | Ex. 5 |
|---|---|---|---|---|---|---|
| POM-1 | parts by mass | 100 | 100 | 100 | 100 |  |
| POM-2 | parts by mass |  |  |  |  |  |
| POM-3 | parts by mass |  |  |  |  | 100 |
| POM-4 | parts by mass |  |  |  |  |  |
| CB-1 | parts by mass | 20 | 20 | 20 | 20 | 20 |
| CB-2 | parts by mass |  |  |  |  |  |
| CB-3 | parts by mass |  |  |  |  |  |
| CB-4 | parts by mass |  |  |  |  |  |
| Epoxy Compound | parts by mass |  | 2 | 2 | 2 | 2 |
| Phosphorus-based Compound | parts by mass |  |  | 1 | 1 | 1 |
| Olefinic Polymer | parts by mass |  |  |  | 3 | 3 |
| Production Method | — | A | A | A | A | A |
| Peak in a Range of Less Than 10,000 in a GPC Chart of Polyacetal Resin in Resin Composition | presence/absence | present | present | present | present | present |
| Amount of Components Having a Molecular Weight of Less Than 10,000 in Polyacetal Resin in Resin Composition | % by mass | 9.2 | 9.4 | 9.5 | 9.8 | 3.2 |
| Peak in a Range of 10,000 or more in a GPC Chart of Polyacetal Resin in Resin Composition | presence/absence | present | present | present | present | present |
| BET Specific Surface Area of Carbon Black in Resin Composition | $m^2/g$ | 23 | 24 | 22 | 26 | 23 |
| Dibutyl Phthalate Oil Absorption of Carbon Black in Resin Composition | mL/100 g | 103 | 117 | 120 | 121 | 143 |
| Content of Alkaline Metal in Resin Composition | ppm by mass | 108 | 103 | 97 | 100 | 88 |
| VR-average | $\Omega \cdot cm$ | 5.8 | 7.4 | 6.2 | 5.5 | 5.8 |
| VR-sigma | $\Omega \cdot cm$ | 2.3 | 3.8 | 2.5 | 3.6 | 2.9 |
| VR-variance | — | 0.40 | 0.51 | 0.40 | 0.65 | 0.50 |
| Formaldehyde Generation Rate | ppm by mass/min | 135 | 96 | 80 | 75 | 112 |
| Molding Resumability after Long-Time Suspension | min | 30 | 30 | 30 | 30 | 30 |
| Mold Deposit | A-C | B | A | A | A | B |
| Gear Precision | μm | 13 | 17 | 19 | 23 | 23 |
| Melt Flow Rate | g/10 min | 0.5 | 0.6 | 0.6 | 0.8 | 0.5 |

|  | Comp. Ex. 1 | Comp. Ex. 2 | Comp. Ex. 3 | Comp. Ex. 4 | Comp. Ex. 5 |
|---|---|---|---|---|---|
| POM-1 |  | 100 | 100 | 100 | 100 |
| POM-2 |  |  |  |  |  |
| POM-3 |  |  |  |  |  |
| POM-4 | 100 |  |  |  |  |
| CB-1 | 20 |  |  |  |  |
| CB-2 |  | 20 |  |  |  |
| CB-3 |  |  | 20 |  |  |
| CB-4 |  |  |  | 20 | 10 |
| Epoxy Compound | 2 | 2 | 2 | 2 | 2 |

TABLE 1-continued

| | | | | | |
|---|---|---|---|---|---|
| Phosphorus-based Compound | 1 | 1 | 1 | 1 | 1 |
| Olefinic Polymer | 3 | 3 | 3 | 3 | 3 |
| Production Method | A | A | A | A | A |
| Peak in a Range of Less Than 10,000 in a GPC Chart of Polyacetal Resin in Resin Composition | absent | present | present | no measurement | present |
| Amount of Components Having a Molecular Weight of Less Than 10,000 in Polyacetal Resin in Resin Composition | 1.8 | 9.5 | 8.8 | | 8.6 |
| Peak in a Range of 10,000 or more in a GPC Chart of Polyacetal Resin in Resin Composition | present | present | present | | present |
| BET Specific Surface Area of Carbon Black in Resin Composition | 23 | 31 | 33 | | 423 |
| Dibutyl Phthalate Oil Absorption of Carbon Black in Resin Composition | 133 | 122 | 131 | | 175 |
| Content of Alkaline Metal in Resin Composition | 104 | less than 1 | less than 1 | | 2 |
| VR-average | 7.1 | 9.5 | 10.0 | extrusion | 9.9 |
| VR-sigma | 4.9 | 11.5 | 13.7 | was | 13.1 |
| VR-variance | 0.70 | 1.21 | 1.36 | impossible | 1.33 |
| Formaldehyde Generation Rate | 148 | 230 | 72 | | 465 |
| Molding Resumability after Long-Time Suspension | <15 | <15 | 30 | | <15 |
| Mold Deposit | C | C | A | | C |
| Gear Precision | 55 | 63 | 74 | | 94 |
| Melt Flow Rate | 0.3 | 0.8 | 0.7 | | unmeasurable |

TABLE 2

| | Unit | Ex. 3 | Ex. 6 | Ex. 7 | Comp. Ex. 6 | Ex. 8 | Ex. 9 |
|---|---|---|---|---|---|---|---|
| POM-1 | parts by mass | 100 | 100 | 100 | 100 | 100 | 100 |
| POM-2 | parts by mass | | | | | | |
| CB-1 | parts by mass | 20 | 20 | 16 | 20 | 20 | 20 |
| CB-4 | parts by mass | | | 4 | | | |
| Epoxy Compound | parts by mass | 2 | 2 | 2 | 2 | 2 | 2 |
| Phosphorus-based Compound | parts by mass | 1 | 1 | 1 | 1 | 1 | 1 |
| Production Method | — | A | A2 | A2 | A3 | B | B2 |
| Peak in a Range of Less Than 10,000 in a GPC Chart of Polyacetal Resin in Resin Composition | presence/absence | present | present | present | present | present | present |
| Amount of Components Having a Molecular Weight of Less Than 10,000 in Polyacetal Resin in Resin Composition | % by mass | 9.5 | 12.5 | 12.4 | 11.9 | 8.6 | 10.6 |
| Peak in a Range of 10,000 or more in a GPC Chart of Polyacetal Resin in Resin Composition | presence/absence | present | present | present | present | present | present |
| BET Specific Surface Area of Carbon Black in Resin Composition | $m^2/g$ | 22 | 44 | 91 | 18 | 49 | 48 |
| Dibutyl Phthalate Oil Absorption of Carbon Black in Resin Composition | mL/100 g | 120 | 170 | 165 | 90 | 156 | 160 |
| Content of Alkaline Metal in Resin Composition | ppm by mass | 97 | 65 | 42 | 65 | 120 | 124 |
| VR-average | Ω · cm | 6.2 | 9.2 | 9.7 | 8.8 | 6.0 | 6.3 |
| VR-sigma | Ω · cm | 2.5 | 6.7 | 8.9 | 10.4 | 1.6 | 1.5 |
| VR-variance | — | 0.40 | 0.73 | 0.92 | 1.18 | 0.27 | 0.23 |
| Formaldehyde Generation Rate | ppm by mass/min | 80 | 65 | 152 | 105 | 45 | 68 |
| Molding Resumability after Long-Time Suspension | min | 30 | 45 | 30 | 30 | 60< | 45 |
| Mold Deposit | A-C | A | A | B | A | A | B |
| Gear Precision | μm | 19 | 15 | 22 | 103 | 13 | 14 |
| Melt Flow Rate | g/10 min | 0.6 | 0.8 | 1.0 | 0.4 | 1.2 | 1.5 |

| | Comp. Ex. 7 | Ex. 10 | Ex. 11 | Comp. Ex. 8 | Ex. 12 | Ex. 13 | Ex. 14 |
|---|---|---|---|---|---|---|---|
| POM-1 | | 100 | 100 | 100 | 100 | 100 | 100 |
| POM-2 | 100 | | | | | | |
| CB-1 | 20 | 20 | 20 | 20 | 20 | 20 | 20 |
| CB-4 | | | | | | | |
| Epoxy Compound | 2 | 2 | 2 | 2 | 2 | 2 | 2 |
| Phosphorus-based Compound | 1 | 1 | 1 | 1 | 1 | 1 | 1 |
| Production Method | B2 | C | C2 | C3 | C4 | C5 | D |
| Peak in a Range of Less Than 10,000 in a GPC Chart of Polyacetal Resin in Resin Composition | present | present | present | present | present | present | present |
| Amount of Components Having a Molecular Weight of Less Than 10,000 in Polyacetal Resin in Resin Composition | 11.2 | 8.6 | 9.5 | 8.8 | 8.4 | 9.2 | 9.5 |

TABLE 2-continued

| | | | | | | | |
|---|---|---|---|---|---|---|---|
| Peak in a Range of 10,000 or more in a GPC Chart of Polyacetal Resin in Resin Composition | present | present | present | present | present | present | present |
| BET Specific Surface Area of Carbon Black in Resin Composition | 22 | 67 | 45 | 15 | 63 | 94 | 22 |
| Dibutyl Phthalate Oil Absorption of Carbon Black in Resin Composition | 95 | 190 | 160 | 87 | 165 | 260 | 109 |
| Content of Alkaline Metal in Resin Composition | 111 | 113 | 109 | 96 | 111 | 93 | 100 |
| VR-average | 21.0 | 5.2 | 5.2 | 5.4 | 5.9 | 5.9 | 11.9 |
| VR-sigma | 18.8 | 1.0 | 2.2 | 1.8 | 2.9 | 2.7 | 9.2 |
| VR-variance | 0.90 | 0.20 | 0.43 | 0.34 | 0.49 | 0.46 | 0.77 |
| Formaldehyde Generation Rate | 75 | 45 | 59 | 139 | 41 | 123 | 79 |
| Molding Resumability after Long-Time Suspension | 45 | 60< | 60< | 30 | 60< | 30 | 60< |
| Mold Deposit | | A | A | A | C | A | B | A |
| Gear Precision | 15 | 11 | 12 | 11 | 9.5 | 22 | 26 |
| Melt Flow Rate | 16.5 | 2.1 | 2.5 | 2.7 | 2.6 | 3.0 | 2.2 |

The present application is based on Japanese Patent Application (Japanese Patent Application No. 2012-258277), filed on Nov. 27, 2012, the contents of which are hereby incorporated by reference.

INDUSTRIAL APPLICABILITY

The polyacetal resin composition according to the present invention is a resin composition excellent in the dimensional precision, the thermal stability and electroconductivity, and further capable of suppressing the variation width in the electroconductivity among molded articles. Therefore, the polyacetal resin composition according to the present invention can suitably be utilized broadly in the fields of precision parts of automobiles and electric and electronic devices, and other industrial fields. The polyacetal resin composition according to the present invention can especially suitably be utilized for mechanism parts such as gears, flanges and bearings.

REFERENCE SIGNS LIST 1 to 14: barrel zones of extruder (separately independent)
15: die head
16: extruder motor
17: main throat
18: side feeder
19: side feeder
20: degassing vent

What is claimed is:

1. A resin composition, comprising:
a polyacetal resin,
a carbon black and
an alkaline metal,
the alkaline metal being contained within the carbon black;
wherein:
the polyacetal resin in the resin composition has at least one peak in each of a range of a molecular weight thereof of less than 10,000 and a range of a molecular weight thereof of 10,000 or more in a chart of a gel permeation chromatography (GPC) measurement;
the carbon black in the resin composition has a BET specific surface area (nitrogen adsorption method) of 20 to 150 m$^2$/g;
the carbon black in the resin composition has a dibutyl phthalate oil absorption of 100 to 300 mL/100 g;
a content of the carbon black in the resin composition is at least 10% by mass; and
a content of the alkaline metal in the resin composition is 1 to 150 ppm by mass; and
wherein the resin composition has a melt flow rate of less than 8 g/10 min.

2. The resin composition according to claim 1, wherein the polyacetal resin in the resin composition has an amount of components having a molecular weight of less than 10,000 in a chart of a gel permeation chromatography (GPC) measurement of 3 to 15% by mass.

3. The resin composition according to claim 1, wherein when the resin composition is heated at 230° C. in a nitrogen gas flow, the resin composition exhibits a generation rate of formaldehyde generated during a heating time of from 10 min to 30 min of 100 ppm by mass/min or less.

4. The resin composition according to claim 1, wherein the resin composition has a volume specific resistance at room temperature of 100 Ω·cm or less.

5. The resin composition according to claim 1, further comprising an epoxy compound.

6. The resin composition according to claim 5, further comprising an epoxy resin-curing additive.

7. The resin composition according to claim 1, further comprising an olefinic resin.

8. A molded article, comprising a resin composition, comprising:
a polyacetal resin,
a carbon black and
an alkaline metal,
the alkaline metal being contained within the carbon black;
wherein:
the polyacetal resin in the resin composition has at least one peak in each of a range of a molecular weight thereof of less than 10,000 and a range of a molecular weight thereof of 10,000 or more in a chart of a gel permeation chromatography (GPC) measurement;
the carbon black in the resin composition has a BET specific surface area (nitrogen adsorption method) of 20 to 150 m$^2$/g;
the carbon black in the resin composition has a dibutyl phthalate oil absorption of 100 to 300 mL/100 g;
a content of the carbon black in the resin composition is at least 10% by mass; and
a content of the alkaline metal in the resin composition is 1 to 150 ppm by mass; and wherein the resin composition has a melt flow rate of less than 8 g/10 min.

9. An injection-molded gear, comprising a resin composition, comprising:
- a polyacetal resin,
- a carbon black and
- an alkaline metal,
- the alkaline metal being contained within the carbon black;

wherein:
- the polyacetal resin in the resin composition has at least one peak in each of a range of a molecular weight thereof of less than 10,000 and a range of a molecular weight thereof of 10,000 or more in a chart of a gel permeation chromatography (GPC) measurement;
- the carbon black in the resin composition has a BET specific surface area (nitrogen adsorption method) of 20 to 150 $m^2/g$;
- the carbon black in the resin composition has a dibutyl phthalate oil absorption of 100 to 300 mL/100 g;
- a content of the carbon black in the resin composition is at least 10% by mass; and
- a content of the alkaline metal in the resin composition is 1 to 150 ppm by mass; and wherein the resin composition has a melt flow rate of less than 8 g/10 min.

10. A flange of a photoreceptor drum in an image-forming apparatus, comprising a resin composition, comprising:
- a polyacetal resin,
- a carbon black and
- an alkaline metal,
- the alkaline metal being contained within the carbon black;

wherein:
- the polyacetal resin in the resin composition has at least one peak in each of a range of a molecular weight thereof of less than 10,000 and a range of a molecular weight thereof of 10,000 or more in a chart of a gel permeation chromatography (GPC) measurement;
- the carbon black in the resin composition has a BET specific surface area (nitrogen adsorption method) of 20 to 150 $m^2/g$;
- the carbon black in the resin composition has a dibutyl phthalate oil absorption of 100 to 300 mL/100 g;
- a content of the carbon black in the resin composition is at least 10% by mass; and
- a content of the alkaline metal in the resin composition is 1 to 150 ppm by mass; and wherein the resin composition has a melt flow rate of less than 8 g/10 min.

* * * * *